(12) United States Patent
Xin et al.

(10) Patent No.: US 11,236,867 B2
(45) Date of Patent: Feb. 1, 2022

(54) METHOD FOR DETECTING PIPE BURST IN WATER DISTRIBUTION SYSTEMS BASED ON PRESSURE DISTURBANCE EXTRACTION

(71) Applicant: TONGJI UNIVERSITY, Shanghai (CN)

(72) Inventors: Kunlun Xin, Shanghai (CN); Weirong Xu, Shanghai (CN); Xiao Zhou, Shanghai (CN); Hexiang Yan, Shanghai (CN); Tao Tao, Shanghai (CN); Shuping Li, Shanghai (CN)

(73) Assignee: Tongji University, Shanghai (CN)

( * ) Notice: Subject to any disclaimer, the term of this patent is extended or adjusted under 35 U.S.C. 154(b) by 247 days.

(21) Appl. No.: 16/600,557

(22) Filed: Oct. 13, 2019

(65) Prior Publication Data

US 2020/0158291 A1 May 21, 2020

(30) Foreign Application Priority Data

Nov. 21, 2018 (CN) .......................... 201811393693.X (51) Int. Cl.
*F17D 5/02* (2006.01)
*G01M 3/28* (2006.01)

(52) U.S. Cl.
CPC ............. *F17D 5/02* (2013.01); *G01M 3/2815* (2013.01)

(58) Field of Classification Search
CPC ............................... F17D 5/02; G01M 3/2815
See application file for complete search history.

(56) References Cited

U.S. PATENT DOCUMENTS

| 2015/0330168 | A1* | 11/2015 | Sun ..................... E21B 21/10 |
| | | | 700/282 |
| 2018/0202612 | A1* | 7/2018 | Simpson ................ G01N 19/08 |
| 2020/0143292 | A1* | 5/2020 | Huang ..................... G06N 3/08 |

OTHER PUBLICATIONS

PE2E Search, Aug. 12, 2021, 8 pp. (Year: 2021).*
NPL_557_1 Search Results, Aug. 12, 2021, 1 pp. (Year: 2021).*
NPL_557_2 Search Results, Aug. 12, 2021, 1 pp. (Year: 2021).*
Google Search Results, Aug. 12, 2021, 1 pp. (Year: 2021).*
Meseguer J, Mirats-Tur J M, Cembrano G, et al. A decision support system for on-line leakage localization. Environmental Modelling & Software, 2014, 60(10): 331-345.

(Continued)

*Primary Examiner* — Toan M Le
*Assistant Examiner* — Xiuqin Sun (57) ABSTRACT

The present invention introduced a method for detecting pipe bursts in water distribution systems based on pressure disturbance extraction, including following steps: (1) collecting and pre-processing monitored pressure data, and establishing a matrix of monitored pressures; (2) analyzing time-domain and frequency-domain features of the matrix of monitored pressures by Fourier transform, extracting disturbances, and generating pressure disturbances matrices; (3) identifying outliers in the pressure disturbances matrices by isolation forest algorithm; and (4) further identifying detected outliers by calculating and qualitative index A and quantitative index B and outputting a result of pipe burst detection. Compared with previous methods, the pipe burst detection method introduced in the present invention is accurate and reliable, and is more applicable to large-scale complex water distribution systems.

5 Claims, 2 Drawing Sheets

(56) References Cited

OTHER PUBLICATIONS

Misiunas D, Lambert M, Simpson A, et al. Burst detection and location in water distribution networks. Water Science & Technology: Water Supply, 2005, 5(3), 3-4.
Mpesha W, Chaudhry M.H. and Gassman S.L. Leak detection in pipes by frequency response method. Journal of Hydraulic Engineering, 2001, 127 (2),134-147.
Romano M,Kapelan Z, D.A.Automated detection of pipe bursts and other events in water distribution systems.Journal of Water Resources Planning and Management,2014,140(4),457-467.

* cited by examiner

METHOD FOR DETECTING PIPE BURST IN WATER DISTRIBUTION SYSTEMS BASED ON PRESSURE DISTURBANCE EXTRACTION

CROSS-REFERENCE TO RELATED APPLICATIONS

This application claims the benefit of priority from Chinese Patent Application No. CN 201811393693.X, filed on Nov. 21, 2018. The content of the aforementioned application, including any intervening amendments thereto, is incorporated herein by reference in its entirety.

TECHNICAL FIELD

The present invention relates to a method for detecting pipe burst in water distribution systems, especially for detecting pipe burst in water distribution systems based on pressure disturbance extraction.

BACKGROUND OF THE PRESENT INVENTION

As an important part of urban infrastructure, water distribution systems are responsible for safe and reliable delivery of water to users. With the rapid development of the society and economy, the urbanization process is accelerating, the water demand of residents is increasing, and the scale of urban water distribution systems is gradually expanding. However, due to the long service time of some water distribution systems and serious aging and corrosion of pipes, pipe burst events frequently occur in water distribution systems. Besides, there is a lack of accurate and efficient methods to detect pipe burst events in water distribution systems. Finding pipe burst events mainly depends upon manual inspection of the water utilities and consumer complaints. As a result, it takes a long time to find pipe bursts. A huge amount of water resource is wasted, causing economic loss. Furthermore, it may disrupt normal water supplies service and damage roads or buildings, affecting the normal life of residents. In addition, microorganisms such as bacteria and pathogens may enter the water distribution systems from broken areas, causing water discoloration or bacteriological issues. Therefore, it is of great significance to develop reliable and effective real-time pipe burst detection methods to timely find pipe burst events in order to reduce the impact of pipe burst.

There have been a large number of methods for detecting pipe burst in water distribution systems worldwide. The existing pipe burst detection methods can be mainly divided into three types: hydraulic model methods, transient-based methods, and data-driven methods. The introduction and representative publication of each method are shown as follows:

1) Hydraulic Model Methods

Representative publication:
[1]: Meseguer J, Mirats-Tur J M, Cembrano G, et al. A decision support system for on-line leakage localization. Environmental Modelling & Software, 2014, 60(10): 331-345.

Hydraulic model methods are based on hydraulic models of water distribution systems. Pipe bursts are simulated by the orifice discharge formula and pipe burst is detected by solving the water distribution system energy conservation equation and the ring energy equations.

Advantage:
Hydraulic model methods have clear theoretical basis. Pipe bursts detection are implemented by solving basic equations of the water distribution system.

Disadvantages:
(1) These methods rely heavily on accurate hydraulic models, but most hydraulic models of the water distribution systems established by the water utilities cannot meet the requirement of accuracy;
(2) The performance of these methods is easily susceptible to the uncertainty of the water distribution systems, and these methods require a great number of sensors in the water distribution systems. Therefore, at present, it is difficult to apply these methods to real-life water distribution systems.

2) Transient-Based Methods

Representative publications:
[2]: Misiunas D, Lambert M, Simpson A, et al. Burst detection and location in water distribution networks. Water Science & Technology: Water Supply, 2005, 5(3), 3-4.
[3]: Mpesha W, Chaudhry M. H. and Gassman S. L. Leak detection in pipes by frequency response method. Journal of Hydraulic Engineering, 2001, 127 (2), 134-147.

Transient-based methods are based on monitored data collected by high-frequency pressure sensors. Pipe bursts are detected by detecting pressure wave generated by pipe bursts or analyzing the change in transient signals generated by pipe bursts.

Advantages:
(1) These methods have following advantages: the model calculation results of these methods are accurate
(2) These methods quickly localize pipe bursts and facilitate maintenance.

Disadvantages:
(1) These methods require a large amount of expensive high-frequency pressure sensors.
(2) These methods are computationally complex and have been verified only in single pipe or strictly-controlled laboratory systems. They have not yet been applied in large-scale water distribution systems.

3) Data-Driven Methods

Representative publications:
[4]: Wu Y, Liu S, Wu X et al. Burst detection in district metering areas using a data driven clustering algorithm. Water Research, 2016, 100, 28-37.
[5]: Romano M, Kapelan Z, Savic D. A. Automated detection of pipe bursts and other events in water distribution systems. Journal of Water Resources Planning and Management, 2014, 140(4), 457-467.

Data-driven methods are based on monitored data collected by the supervisory control and data acquisition (SCADA) systems in water distribution systems. Pipe bursts are detected by analyzing SCADA data with various data mining algorithms.

Advantages:
These methods can detect pipe bursts by using monitored data of the water distribution system in daily operation, without requirement of accurate hydraulic models and expensive high-frequency pressure sensor.

Disadvantages:
(1) The previous methods are usually applicable to water distribution systems that are divided into district metering areas, and only pipe bursts in the district metering areas can be detected. Although the district metering area management is an internationally recognized measure that facilitates pipe burst and leakage control, it has not been widely used, especially in China, where most water distribution systems are still centralized monitoring due to the large scale of water distribution systems and its complex topology.

(2) The previous methods detect pipe bursts mainly based on flow data. It is because that monitored flow data is relatively sensitive with respect to pipe bursts compared with pressure data. Therefore, most previous methods ignore the application of pressure data. However, due to the high cost of the flow sensors, flow sensors in large-scale water distribution systems are usually much less than pressure sensors.

In conclusion, these methods are not suitable for large-scale complex water distribution systems, although they have been applied in water distribution networks that are divided into district metering areas.

Consequently, there is no pipe burst detection methods which can be widely used in large-scale water distribution systems, although there has been a lot of studies on pipe burst detection.

SUMMARY OF THE PRESENT INVENTION

The aim of the present invention is to provide a method for detecting pipe bursts in water distribution systems based on pressure disturbance extraction, in order to overcome shortcomings of previous methods.

The purpose of the present invention can be implemented by the following steps:

(1) collecting and pre-processing monitored pressure data, and establishing pressure matrices;

(2) analyzing time-domain and frequency-domain features of the matrix of monitored pressures by Fourier transform, extracting pressure disturbance, and generating pressure disturbances matrices;

(3) identifying outliers in the pressure disturbances matrices by isolation forest algorithm; and (4) further identifying detected outliers by calculating and qualitative index A and quantitative index B and outputting a result of pipe burst detection.

The step (1) can be implemented by following steps:

(11) numbering the date and time of historical data;

(12) for a moment t=(x,y) to be detected, extracting SCADA monitored pressure data in m days before the moment t, where (x,y) represents the moment y in the $x^{th}$ day;

(13) pre-processing the extracted monitored pressure data;

(14) dividing the pre-processed pressure data at a sensor into m row vectors, each vector having a length of N, N being the number of samples at one sensor in a day, and storing the row vectors in pre-processed pressure matrices P. For the $i^{th}$ sensor, the corresponding matrix $P_i$ is:

$$P_i = \begin{pmatrix} p_{x-m,y+1} & \cdots & p_{x-m,N} & p_{x-m+1,1} & \cdots & p_{x-m+1,y} \\ p_{x-m+1,y+1} & \cdots & p_{x-m+1,N} & p_{x-m+2,1} & \cdots & p_{x-m+2,y} \\ \vdots & \ddots & \vdots & \vdots & \ddots & \vdots \\ p_{x-1,y+1} & \cdots & p_{x-1,N} & p_{x,1} & \cdots & p_{x,y} \end{pmatrix},$$

where element $p_{j,k}$ in $P_i$ represents the monitored pressure at the sensor i at the moment k in the $j^{th}$ day, the $m^{th}$ row in $P_i$ represents the monitored pressure at the sensor i in a day before the moment to be detected. For n sensors, total n matrices of monitored pressures are generated.

The step (13) can be implemented by following steps:

(131) considering a sensor with plenty of blank data as an invalid sensor, and abandoning the monitored pressure data at the sensor;

(132) linearly interpolating the remained monitored pressure data at sensors and filling missing values; and (133) setting an upper threshold and a lower threshold to remove the monitored pressure data which is abnormal in remained data.

The step (2) can be implemented by following steps:

(21) processing row vectors in pre-processed pressure matrices by Fourier transform. Given that each row in pre-processed pressure matrices is a discrete signal x[n] having a length of N, then the Fourier transform X[k] is:

$$X[k] = \sum_{n=0}^{N-1} x[n] e^{-j\frac{2\pi}{N}kn}, 0 \leq k \leq N-1$$

where X[k] is the Fourier transform of x[n], and $$e^{-j\frac{2\pi}{N}kn}$$

is a periodic complex-exponential function of $$\frac{2\pi}{N};$$

(22) extracting high-frequency components (disturbances) in the monitored signal. The high-frequency component X'[k] in the frequency domain is extracted as follows:

$$X'[k] = \begin{cases} X[k], & \mu \leq k \leq N-\mu \\ 0, & \text{otherwise} \end{cases}, 0 \leq k \leq N-1$$

where, $\mu$ is a parameter which controls the number of selected high-frequency components;

(23) reconstructing the extracted high-frequency component X'[k] in the frequency domain into a time-domain signal x'[n] by inverse Fourier transform:

$$x'[n] = \frac{1}{N} \sum_{n=0}^{N-1} X'[k] e^{j\frac{2\pi}{N}kn}, 0 \leq n \leq N-1$$

(24) generating a matrix H of disturbed pressures, for the $i^{th}$ sensor, the corresponding disturbance matrix $H_i$ is:

$$H_i = \begin{pmatrix} h_{x-m,y+1} & L & h_{x-m,N} & h_{x-m+1,1} & L & h_{x-m+1,y} \\ h_{x-m+1,y+1} & L & h_{x-m+1,N} & h_{x-m+2,1} & L & h_{x-m+2,y} \\ M & O & M & M & O & M \\ h_{x-1,y+1} & L & h_{x-1,N} & h_{x,1} & L & h_{x,y} \end{pmatrix},$$

where element $h_{j,k}$ in $H_i$ represents the high-frequency component extracted from the monitored pressure at the sensor i at the moment k in the $j^{th}$ day. For n sensors, total n matrices of disturbed pressures are generated.

The step (3) can be implemented by following steps:

(31) establishing a detection matrix D using pre-processed pressure matrices:

$$D = \begin{pmatrix} d_{x-m+1,1} & L & d_{x-m+1,n} \\ M & O & M \\ d_{x,1} & L & d_{x,n} \end{pmatrix},$$

where the $i^{th}$ column in the detection matrix D corresponds to the last column in the matrix $H_i$ of high-frequency components, each row in the detection matrix D is a row vector having a length of n, and the last row in the detection matrix D is the high-frequency components extracted at sensors at the moment to be detected;

(32) inputting the detection matrix D into the isolation forest algorithm with each row in the detection matrix D being a detection sample, establishing t isolation trees, randomly selecting one dimension x as a study object for each isolation tree, $1 \leq x \leq n$, randomly selecting a boundary value in this dimension to divide samples into two parts, and repeating this process until all samples are separated from others;

(33) calculating an average path length of each sample in all isolation trees, wherein, for each sample in each isolation tree, the number of separations for this detection sample from other detection samples is the path length of this detection sample in this isolation tree, selecting k detection samples with minimal average path length as abnormal samples;

(34) if the last row in the detection matrix D is selected as an abnormal sample, then identifying the moment to be detected as an abnormal state and passing the results to step (4), otherwise outputting a result indicating that no pipe burst occurs.

The step (4) can be implemented by following steps:

(41) calculating a qualitative index A:

$$A = \begin{cases} 0, Sum_m \geq \overline{Sum} \\ 1, Sum_m < \overline{Sum} \end{cases}$$

where, $$\overline{Sum} = \frac{1}{m-1} \sum_{i=1}^{m-1} Sum_i,$$

$$Sum_i = \sum_{j=1}^{n} D(i, j), i = 1, 2, L, m,$$

D(i,j) represents the element in the $i^{th}$ row and the $j^{th}$ column in detection matrix D, m represents the total number of rows in detection matrix D, n represents the total number of columns in detection matrix D, and $Sum_m$ represents the sum of the last row in detection matrix D;

(42) calculating a quantitative index B:

$$B = \begin{cases} 0, Sum_m \in (\overline{Sum} - \lambda\delta, \overline{Sum} + \lambda\delta) \\ 1, \text{otherwise} \end{cases}$$

where, $\lambda$ is a parameter which controls the number of selected high-frequency components, and $\delta$ represents the standard deviation of $Sum_i$, i=1, 2, . . . , m−1; and (43) outputting a result indicating that pipe burst occurs if both qualitative index A and quantitative index B are 1, otherwise outputting a result indicating that no pipe burst occurs.

Compared with previous methods, the present method has the following advantages:

(1) In the present invention, by analyzing time-domain and frequency-domain features of the monitored pressures, pressure fluctuations in the time domain caused by pipe burst is associated with the high-frequency components in the frequency domain, and pressure fluctuations caused by pipe bursts are extracted as disturbances. Pressure drop caused by pipe bursts can be separated from pressure fluctuations caused by normal change of consumer demands, so the impact of normal demand deviation is reduced and the result is more accurate.

(2) In the present invention, the real-time pipe burst detection in large-scale complex water distribution systems can be realized accurately and reliably by merely using monitored pressure data. This method is more applicable to large-scale water distribution systems which have less flow sensors and more pressure sensors and have not been divided into district metering areas.

DETAILED DESCRIPTION OF THE PRESENT INVENTION

The present invention will be described below in detail with reference to the accompanying drawings by specific embodiments. It is to be noted that the following description of the implementations is merely illustrative and the present invention is not intended to limit the applications or uses thereof. Furthermore, the present invention is not limited to the following implementations.

Embodiment

Figure 1:
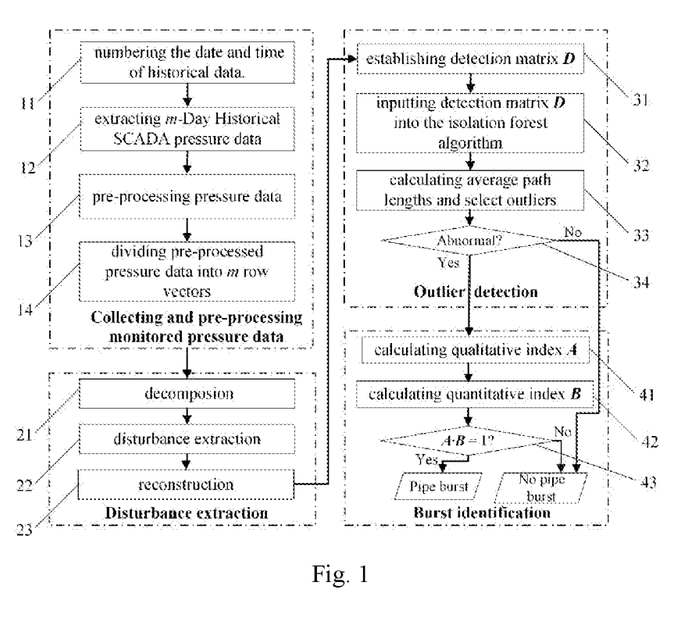
FIG. 1 is a flowchart of the method for detecting pipe burst in water distribution systems based on pressure disturbance extraction.

As shown in FIG. 1, a method for detecting pipe bursts in water distribution systems based on pressure disturbance extraction is provided, comprising following steps:

(1) collecting and pre-processing monitored pressure data, and establishing pressure matrices;

(2) analyzing time-domain and frequency-domain features of the matrix of monitored pressures by Fourier transform, extracting disturbances, and generating pressure disturbances matrices;

(3) identifying outliers in the pressure disturbances matrices by the isolation forest algorithm;

(4) further identifying detected outliers by calculating and qualitative index A and quantitative index B and outputting a result of pipe burst detection.

The step (1) can be implemented by following steps:

(11) numbering the date and time of historical data. For example, 1 corresponds to January 1 and 2 corresponds to January 2; when the sampling frequency at a sensor is T min, 1 corresponds to 0:00 and 2 corresponds to 0: T;

(12) for a moment t=(x,y) to be detected, extracting SCADA monitored pressure data in m days before the moment t, where (x,y) represents the moment y in the $x^{th}$ day;

(13) pre-processing the extracted monitored pressure data;

(14) dividing the pre-processed pressure data at a sensor into m row vectors, each vector having a length of N, N being the number of samples at one sensor in a day, and storing the row vectors in pre-processed pressure matrices P. For the $i^{th}$ sensor, the corresponding matrix $P_i$ is:

$$P_i = \begin{pmatrix} p_{x-m,y+1} & L & p_{x-m,N} & p_{x-m+1,1} & L & p_{x-m+1,y} \\ p_{x-m+1,y+1} & L & p_{x-m+1,N} & p_{x-m+2,1} & L & p_{x-m+2,y} \\ M & O & M & M & O & M \\ p_{x-1,y+1} & L & p_{x-1,N} & p_{x,1} & L & p_{x,y} \end{pmatrix},$$

where the element $p_{j,k}$ in $P_i$ represents the monitored pressure at the sensor i at the moment k in the $j^{th}$ day, the $m^{th}$ row in $P_i$ represents the monitored pressure at the sensor i in a day before the moment to be detected. For n sensors, total n matrices of monitored pressures are generated.

The step (13) can be implemented by following steps:

(131) considering a sensor with plenty of blank data as an invalid sensor, and abandoning the monitored pressure data at the sensor;

(132) linearly interpolating the remained monitored pressure data at sensors and filling missing values; and (133) setting an upper threshold and a lower threshold to remove the monitored pressure data which is abnormal in remained data.

At the end of data pre-processing, time-domain and frequency-domain features of the monitored data are analyzed by Fourier transform. The disturbance extraction is implemented by associating high-frequency components in the monitored data with the abrupt pressure drop caused by pipe burst. Therefore, the step (2) can be implemented by following steps:

(21) considering a row in a matrix of monitored pressures at a sensor as a discrete aperiodic signal, decomposing this signal into a series of linear combinations of complex-exponential signals by Fourier transform. Given that each row in pre-processed pressure matrices is a discrete signal x[n] having a length of N, then the Fourier transform X[k] is:

$$X[k] = \sum_{n=0}^{N-1} x[n] e^{-j\frac{2\pi}{N}kn}, 0 \leq k \leq N-1,$$

where, X[k] is the Fourier transform of x[n], and $$e^{-j\frac{2\pi}{N}kn}$$

is a periodic complex-exponential function of $$\frac{2\pi}{N};$$

(22) extracting high-frequency components (disturbances) in the monitored signal. The high-frequency component X'[k] in the frequency domain is extracted as follows:

$$X'[k] = \begin{cases} X[k], \mu \leq k \leq N-\mu \\ 0, \text{otherwise} \end{cases}, 0 \leq k \leq N-1$$

where, $\mu$ is a parameter for controlling the selection of the number of high-frequency terms;

(23) reconstructing the extracted high-frequency component X'[k] in the frequency domain into a time-domain signal x'[n] by inverse Fourier transform:

$$x'[n] = \frac{1}{N} \sum_{k=0}^{N-1} X'[k] e^{j\frac{2\pi}{N}kn}, 0 \leq n \leq N-1$$

(24) generating a matrix H of disturbed pressures, wherein, for the $i^{th}$ sensor, the corresponding matrix $H_i$ of disturbed pressures is:

$$H_i = \begin{pmatrix} h_{x-m,y+1} & L & h_{x-m,N} & h_{x-m+1,1} & L & h_{x-m+1,y} \\ h_{x-m+1,y+1} & L & h_{x-m+1,N} & h_{x-m+2,1} & L & h_{x-m+2,y} \\ M & O & M & M & O & M \\ h_{x-1,y+1} & L & h_{x-1,N} & h_{x,1} & L & h_{x,y} \end{pmatrix},$$

where element $h_{j,k}$ in $H_i$ represents the high-frequency component extracted from the monitored pressure at the sensor i at the moment k in the $j^{th}$ day. For n sensors, total n matrices of disturbed pressures are generated.

The step (3) can be implemented by following steps:

(31) establishing a detection matrix D using pre-processed pressure matrices:

$$D = \begin{pmatrix} d_{x-m+1,1} & L & d_{x-m+1,n} \\ M & O & M \\ d_{x,1} & L & d_{x,n} \end{pmatrix},$$

where, the $i^{th}$ column in the detection matrix D corresponds to the last column in the matrix $H_i$ of high-frequency components, each row in the detection matrix D is a row vector having a length of n, and the last row in the detection matrix D is the high-frequency components extracted at sensors at the moment to be detected;

(32) inputting the detection matrix D into the isolation forest algorithm with each row in the detection matrix D being a detection sample, establishing t isolation trees. randomly selecting one dimension x as a study object for each isolation tree, 1≤x≤n, randomly selecting a boundary value in this dimension to divide samples into two parts, and repeating this process until all samples are separated from others;

(33) calculating an average path length of each sample in all isolation trees, wherein, for each sample in each isolation tree, the number of separations for this detection sample from other detection samples is the path length of this detection sample in this isolation tree, selecting k detection samples with minimal average path length as abnormal samples;

(34) if the last row in the detection matrix D is selected as an abnormal sample, then identifying the moment to be detected as an abnormal state and passing the results to step (35), otherwise outputting a result indicating that no pipe burst occurs.

To avoid the impact of pressure fluctuations caused by normal demand deviations in water distribution systems, the detected abnormal states should be further identified based on the system pressure response features during pipe bursts. That is, the step (4) is to further identify the detected abnormal state, which is implement by calculating qualitative index A and quantitative index B. The step (4) can be implemented by following steps:

(41) calculating a qualitative index A:

$$A = \begin{cases} 0, Sum_m \geq \overline{Sum} \\ 1, Sum_m < \overline{Sum} \end{cases}$$

where, $\overline{Sum} = \frac{1}{m-1}\sum_{i=1}^{m-1} Sum_i$, $Sum_i = \sum_{j=1}^{n} D(i,j)$, $i = 1, 2, L, m$, D(i,j) represents the element in the $i^{th}$ row and the $j^{th}$ column in the detection matrix D, m represents the total number of rows in the detection matrix D, n represents the total number of columns in the detection matrix D, and $Sum_m$ represents the sum of the last row in the detection matrix D;

(42) calculating a quantitative index B:

$$B = \begin{cases} 0, Sum_m \in (\overline{Sum} - \lambda\delta, \overline{Sum} + \lambda\delta) \\ 1, \text{otherwise} \end{cases}$$

where, $\lambda$ is a parameter which controls the number of selected high-frequency components, and $\delta$ represents the standard deviation of $Sum_i$, i=1, 2, . . . , m−1; and (43) outputting a result indicating that pipe burst occurs if both qualitative index A and quantitative index B are 1, otherwise outputting a result indicating that no pipe burst occurs.

To further demonstrate the implement of the method, a real-life pipe burst which occurred in a water distribution system at 3:15 on Mar. 28, 2016 is taken as an example.

(1) Pressure data is collected and pre-processed, and pre-processed pressure matrices are established.

There are total 23 sensors in the water distribution system, and the sampling interval at the sensors is 15 min. The monitored data at all sensors in 15 days before this moment is collected. The monitored values above 50 m and below 0 m are deleted. After the pre-processing, there are total 18 valid sensors. The pre-processed data is stored in pre-processed pressure matrices P. 18 pre-processed pressure matrices are generated. Since the sampling interval at the sensors is 15 min, 24 h/15 min=96 data are sampled every day at each sensor. Each matrix of monitored pressures has a dimension of 15 rows×96 columns.

(2) Time-domain and frequency-domain features of each row in pre-processed pressure matrices are analyzed by Fourier transform, disturbances are extracted and disturbances matrices are generated.

Figure 2:
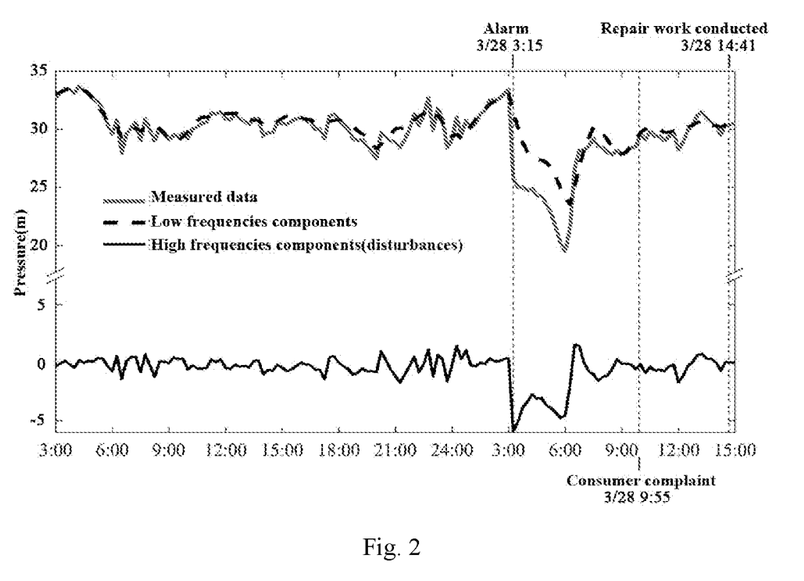
FIG. 2 is a graph of the monitored pressure data and the extracted high-frequency components at a certain sensor during a real-life pipe burst.

Each row vector (having a length of 96) in each matrix of monitored pressures is considered as one discrete signal, and the spectral composition of this signal is analyzed by Fourier transform. High-frequency components are extracted, where the value of the parameter μ is 10. The extracted high-frequency components are then converted to a time-domain signal by inverse Fourier transform. By taking one sensor as an example, the measured data and the extracted high-frequency value data at this sensor are shown in FIG. 2. The extracted disturbances are stored in H.

(3) Outliers in the matrix of disturbed pressures are detected by using the isolation forest algorithm.

The last columns in the 18 high-frequency components matrices are extracted to the detection matrix D. The detection matrix D is input to the isolation forest algorithm, and each row in the detection matrix D is considered as a sample. 100 isolation trees are generated. An average path length of each sample in all isolation trees is calculated, and k=1 abnormal sample are selected. The moment to be detected is selected as an abnormal sample because. It has minimal average path length. Therefore, the moment to be detected is determined as an abnormal state.

(4) The detected outliers are further identified by qualitative index A and quantitative index B, and a result of pipe burst detection is output.

The qualitative index A and the quantitative index B are calculated. Both of them are 1. Therefore, a result indicating that pipe burst occurs is output. There is a pipe burst repair record indicating that a pipe burst was reported by consumers at 9:55 in that day. Workers found that a pipe with a diameter of 300 mm failed after they arrived on 14:41. Therefore, the detection result is deemed as correct according to the pipe burst repair record. In this instance, the alarm generated by the present invention is approximately 7 hours earlier than the received consumer complaint. The time from the occurrence of pipe burst to the detection of pipe burst is successfully shortened.

To verify the rationality of the detection result, the detection result is compared with the actual pipe burst repair record. This verifies the detection accuracy of this method.

The above embodiments are merely illustrative and are not intended to limit the scope of the present invention. Those embodiments can be implemented in various other ways, and various omissions, substitutions and changes can be made without departing from the scope of the present invention.

What is claimed is:

1. A method for detecting pipe bursts in water distribution systems based on pressure disturbance extraction, the method comprising:
   (1) collecting and pre-processing monitored pressure data, and establishing pressure matrices;
   (11) numbering date and time of historical data;
   (12) for a moment t=(x,y) to be detected, extracting SCADA monitored pressure data in m days before the moment t, wherein (x,y) represents the moment y in the $x^{th}$ day;
   (13) pre-processing the extracted monitored pressure data;
   (14) dividing the pre-processed pressure data at a sensor into m row vectors, each vector having a length of N, N being the number of samples at one sensor in a day, and storing the row vectors in pre-processed pressure matrices P, wherein, for the $i^{th}$ sensor, the corresponding matrix $P_1$ is:

$$P_i = \begin{pmatrix} p_{x-m,y+1} & \cdots & p_{x-m,N} & p_{x-m+1,1} & \cdots & p_{x-m+1,y} \\ p_{x-m,y+1} & \cdots & p_{x-m-1} & p_{x-m+2,1} & \cdots & p_{x-m+2,y} \\ \vdots & \ddots & \vdots & \vdots & \ddots & \vdots \\ p_{x-1,y+1} & \cdots & p_{x-1,N} & p_{x,1} & \cdots & p_{x,y} \end{pmatrix},$$

where element $p_{j,k}$ in $P_i$ represents the monitored pressure at the sensor i at the moment k in the $j^{th}$ day, the $m^{th}$ row in $P_1$ represents the monitored pressure at the sensor i in a day before the moment to be detected, and for n sensors, total n matrices of monitored pressures are generated;

(2) analyzing time-domain and frequency-domain features of the matrix of monitored pressures by Fourier transform, extracting disturbances, and generating pressure disturbances matrices;

(3) identifying outliers in the pressure disturbances matrices by isolation forest algorithm; and (4) identifying detected outliers by calculating a qualitative index A and a quantitative index B, and outputting a result of pipe burst detection.

2. The method of claim 1, wherein the step (13) comprises:

(131) considering a sensor with plenty of blank data as an invalid sensor, and abandoning the monitored pressure data at the sensor;

(132) linearly interpolating the remained monitored pressure data at sensors and filling missing values; and (133) setting an upper threshold and a lower threshold to remove the monitored pressure data, which is abnormal in remained data.

3. A method for detecting pipe bursts in water distribution systems based on pressure disturbance extraction, the method comprising:

(1) collecting and pre-processing monitored pressure data, and establishing pressure matrices;

(2) analyzing time-domain and frequency-domain features of the matrix of monitored pressures by Fourier transform, extracting disturbances, and generating pressure disturbances matrices;

(21) processing row vectors in pre-processed pressure matrices by Fourier transform, wherein, given that each row in pre-processed pressure matrices is a discrete signal $x[n]$ having a length of N, then the Fourier transform $X[k]$ is:

$$X[n] = \sum_{n=0}^{N-1} x[n] e^{-j\frac{2\pi}{N}kn}, 0 \le k \le N-1,$$

where $X[k]$ is the Fourier transform of $x[n]$, and $$e^{-j\frac{2\pi}{N}kn}$$

is a periodic complex-exponential function of $$\frac{2\pi}{N};$$

(22) extracting high-frequency components (disturbances) in the monitored signal, the high-frequency component $X'[k]$ in the frequency domain being extracted as follows:

$$X'[k] = \begin{cases} X[k], & \mu \le k \le N-\mu \\ 0, & \text{otherwise} \end{cases}, 0 \le k \le N-1$$

where, $\mu$ is a parameter which controls the number of selected high-frequency components;

(23) reconstructing the extracted high-frequency component $X'[k]$ in the frequency domain into a time-domain signal $x'[n]$ by inverse Fourier transform:

$$x'[n] = \frac{1}{N} \sum_{k=0}^{N-1} X'[k] e^{j\frac{2\pi}{N}kn}, 0 \le n \le N-1,$$

(24) generating a matrix H of disturbed pressures, wherein, for the $i^{th}$ sensor, the corresponding disturbance matrix $H_i$ is:

$$H_i = \begin{pmatrix} h_{x-m,y+1} & \cdots & h_{x-m,N} & h_{x-m+1,1} & \cdots & h_{x-m+1,y} \\ h_{x-m+1,y+1} & \cdots & h_{x-m+1,N} & h_{x-m+2,1} & \cdots & h_{x-m+2,y} \\ \vdots & \ddots & \vdots & \vdots & \ddots & \vdots \\ h_{x-1,y+1} & \cdots & h_{x-1,N} & h_{x,1} & \cdots & h_{x,y} \end{pmatrix},$$

where element $h_{j,k}$ in $H_i$ represents the high-frequency component extracted from the monitored pressure at the sensor i at the moment k in the $j^{th}$ day. For n sensors, total n matrices of disturbed pressures are generated;

(3) identifying outliers in the pressure disturbances matrices by isolation forest algorithm; and (4) identifying detected outliers by calculating a qualitative index A and a quantitative index B, and outputting a result of pipe burst detection.

4. A method for detecting pipe bursts in water distribution systems based on pressure disturbance extraction, the method comprising:

(1) collecting and pre-processing monitored pressure data, and establishing pressure matrices;

(2) analyzing time-domain and frequency-domain features of the matrix of monitored pressures by Fourier transform, extracting disturbances, and generating pressure disturbances matrices;

(3) identifying outliers in the pressure disturbances matrices by isolation forest algorithm;

(31) establishing a detection matrix D using pre-processed pressure matrices:

$$D = \begin{pmatrix} d_{x-m+1,1} & \cdots & d_{x-m+1,n} \\ \vdots & \ddots & \vdots \\ d_{x,1} & \cdots & d_{x,n} \end{pmatrix},$$

where the $i^{th}$ column in the detection matrix D corresponds to the last column in the matrix $H_i$ of high-frequency components, each row in the detection matrix D is a row vector having a length of n, and the last row in the detection matrix D is the high-frequency components extracted at sensors at the moment to be detected;

(32) inputting the detection matrix D into the isolation forest algorithm, each row in the detection matrix D being a detection sample, establishing t isolation trees, randomly selecting one dimension x as a study object for each isolation tree, $1 \leq x \leq n$, randomly selecting a boundary value in this dimension to divide samples into two parts, and repeating this process until all samples are separated from others;

(33) calculating an average path length of each sample in all isolation trees, wherein, for each sample in each isolation tree, the number of separations for this detection sample from other detection samples is the path length of this detection sample in this isolation tree, selecting k detection samples with minimal average path length as abnormal samples;

(34) if the last row in the detection matrix D is selected as an abnormal sample, then identifying the moment to be detected as an abnormal state and passing the results to step (4), otherwise outputting a result indicating that no pipe burst occurs; and (4) identifying detected outliers by calculating a qualitative index A and a quantitative index B, and outputting a result of pipe burst detection.

5. The method of claim 4, wherein the step (4) comprises:

(41) calculating the qualitative index A:

$$A = \begin{cases} 0, & Sum_m \geq \overline{Sum} \\ 1, & Sum_m < \overline{Sum} \end{cases}$$

where, $\overline{Sum} = \frac{1}{m-1} \sum_{i=1}^{m-1} Sum_i$, $Sum_i = \sum_{j=1}^{n} D(i, j)$, $i = 1, 2, L, m$, D(i,j) represents the element in the $i^{th}$ row and the $j^{th}$ column in the detection matrix D, m represents the total number of rows in the detection matrix D, n represents the total number of columns in the detection matrix D, and $Sum_m$ represents the sum of the last row in the detection matrix D;

(42) calculating the quantitative index B:

$$B = \begin{cases} 0, & Sum_m \in (\overline{Sum} - \lambda\delta, \overline{Sum} + \lambda\delta) \\ 1, & \text{otherwise} \end{cases}$$

where, $\lambda$ is a parameter which controls the number of selected high-frequency components, and $\delta$ represents the standard deviation of $Sum_i$=1, 2, . . . , m−1; and (43) outputting a result indicating that pipe burst occurs if both the qualitative index A and the quantitative index B are 1, or otherwise outputting a result indicating that no pipe burst occurs.

* * * * *